(12) United States Patent
Stokes et al.

(10) Patent No.: US 7,952,760 B2
(45) Date of Patent: May 31, 2011

(54) COLOR MANAGEMENT SYSTEM THAT ENABLES DYNAMIC BALANCING OF PERFORMANCE WITH FLEXIBILITY

(75) Inventors: Michael D Stokes, Eagle, ID (US); Adrian Secchia, Bellevue, WA (US); Cyra Richardson, Bellevue, WA (US); Kerry Hammil, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 12/268,793

(22) Filed: Nov. 11, 2008

(65) Prior Publication Data

US 2009/0064203 A1   Mar. 5, 2009

Related U.S. Application Data

(62) Division of application No. 10/683,153, filed on Oct. 14, 2003, now Pat. No. 7,466,447.

(51) Int. Cl.
G06F 15/00 (2006.01)
G06K 1/00 (2006.01)
H04N 1/60 (2006.01)
G06F 3/12 (2006.01)

(52) U.S. Cl. ...................................... 358/1.9; 358/1.13

(58) Field of Classification Search .................. 345/589; 358/1.1, 1.16, 1.13, 1.14, 1.18, 1.9, 504, 358/527, 537
See application file for complete search history.

(56) References Cited

U.S. PATENT DOCUMENTS

| | | | |
|---|---|---|---|
| 5,502,580 | A | 3/1996 | Yoda et al. |
| 6,462,748 | B1 | 10/2002 | Fushiki et al. |
| 6,525,721 | B1 | 2/2003 | Thomas et al. |
| 6,628,828 | B1 | 9/2003 | Stokes et al. |
| 6,831,999 | B2 | 12/2004 | Haikin |
| 6,977,661 | B1 | 12/2005 | Stokes et al. |
| 7,889,391 | B2 | 2/2011 | Stokes |
| 2003/0158896 | A1 | 8/2003 | Kinoshita et al. |
| 2009/0066717 | A1 | 3/2009 | Stokes |

FOREIGN PATENT DOCUMENTS

| | | |
|---|---|---|
| JP | 0756549 | 3/1995 |
| JP | 0998299 | 4/1997 |
| JP | 2002125125 | 4/2002 |
| JP | 2002199234 | 7/2002 |
| JP | 2004535597 | 11/2004 |
| WO | WO-9531794 | 11/1995 |

OTHER PUBLICATIONS

"Foreign Office Action", Application Serial No. 2004-262917, (Mar. 17, 2010), 3 pages.
Littlewood, D.J. et al., "Pareto-Optimal Formulations for Cost versus Colorimetric Accuracy Trade-Offs in Printer Color Management", ACM Transactions on Graphics, vol. 21, No. 2,,(Apr. 2002),132-175.

(Continued)

*Primary Examiner* — Douglas Q Tran

(57) ABSTRACT

A method and system for allowing a computer system platform the ability to intervene in the content workflow and perform additional color management based upon the content state and any color management policies in place is provided. Profile data from a source is converted to an intermediate color space upon entry into the platform at a choke point. In response to the current color content, profile data, and/or policy controls of the platform, color management input can be managed to change color management data immediately, change color management data at a later point, and/or ignore color management data.

18 Claims, 6 Drawing Sheets

OTHER PUBLICATIONS

Mooney, M.A. "Managing Color in Interactive Systems", Sun Microsystems Computer Corp. Tutorial,(Apr. 1998),169-170.

Stone, M.C. et al., "Color Gamut Mapping and the Printing of Digital Color Images", ACM Transactions on Graphics, vol. 7, No. 4,(Oct. 1988),249-292.

Lowden, Ken "Proofing Technology Advances Offers New Options-And Also Risks", www.inkmarkeronline.com, American Ink Maker,(Sep. 2001),42-48.

Fraser, Bruce "The Power of ColorSync Color Matching, Tap Into the Part of Your System that's Made for Matching Colors", www.macworld.com, (Jun. 1998),105-107.

"Notice of Rejection", Japanese Application No. 2004-262917, (Nov. 5, 2009).

"Foreign Office Action", Chinese Application No. 200410076950.9, (Nov. 2, 2010),23 pages.

Chung, Robert et al., "Color Matching with ICC Profiles—Take One", *The Fourth Color Imaging Conference, Color Science, Systems and Applications*, (Nov. 1996),pp. 10-14.

"Foreign Office Action", Japanese Application No. 2004-262917, (Aug. 13, 2010),3 pages.

"Notice of Allowance", U.S. Appl. No. 12/268,806, (Oct. 27, 2010),6 pages.

"Foreign Office Action", Korean Application No. 10-2004-0068587, (Jan. 14, 2011), 4 pages.

COLOR MANAGEMENT SYSTEM THAT ENABLES DYNAMIC BALANCING OF PERFORMANCE WITH FLEXIBILITY

PRIORITY CLAIM

This application is a divisional of and claims priority to U.S. application Ser. No. 10/683,153 filed Oct. 14, 2003, the disclosure of which is incorporated by reference herein in its entirety.

BACKGROUND

Proper and accurate color management has become an increasing issue. When computers, monitors and printers were first developed for home use, consumers were satisfied that green grass, blue skies, and red shirts looked close to what they expected. As time has passed, manufacturers of monitor equipment, printers, digital cameras, etc. have quickly adapted to the need to get clearer, more accurate color representations produced and/or captured. Companies have developed multimedia and graphics-related application programs as well. Different application programs for performing different types of color object data conversion can operate on one computer platform at the same time.

With the boom of Internet-related business increasing daily, companies are eager to ensure that products and information are being accurately represented. Clothing manufacturers distribute millions of catalogs a year. Year after year, hundreds of millions of dollars are spent on clothes by consumers who never actually see the end product in person until it arrives at their door. However, the number one reason for product return has consistently been the fact that the color shown in the picture, whether in a magazine, on a billboard, on the Internet, or in a catalog did not match the color of the end product when it was received. A company that advertises in a magazine, has a billboard in a downtown city erected, and advertises on television wants to ensure that its company logo is consistent throughout each medium and that each medium portrays an accurate representation of the intended colors. Problems of inadequate continuity in the color management process can lead to millions of lost dollars for companies and consumers alike.

In the medical industry, surgeons and other doctors perform highly delicate and sensitive activities and rely on cameras and monitoring equipment. Today, surgeons perform certain types of procedures based upon the displayed color of objects on the monitor, such as blood, tissue, etc. However, because there is no calibration between the camera and monitor, important data is lost. All calibration of hardware is performed at the factory. For example, the camera may be able to capture the exact color of objects, such as blood, while phosphors in monitors cannot display the rich dark colors of blood. Surgeons have to perform color calculations in their head, similar to manual adjustments that press operators have to perform on the fly. Even so, if all color object data is converted to a standard color space as in some systems, monitors that can display the same gamut as the camera still cannot recapture lost data in the standard color space.

Current computer platforms, such as the Linux® X11 and Microsoft® Windows® XP, allow multiple applications to access hardware for color management purposes. For example, Microsoft® Windows® XP permits twelve (12) different applications to communicate with to hardware elements. An application communicates with a graphics library of the platform, the graphics library communicates with hardware coupled to the platform, and the hardware implements the desired application operation. For each of the different types of platforms, the three systems, application, graphics library, and hardware, have been improved in parallel. However, these parallel solutions have not been coordinated to ensure a specified and/or desired color management schema for any application. The various methods for communicating with hardware elements produce instability and eliminate the possibility for non-intervention of a particular application.

Prior color management systems support a single profile-based color management solution in sequence that forces conversions into that solution, e.g., ColorSync® by Apple®, and ICM® by Microsoft®. These solutions delay the performance intensive color conversion from source to destination device until the last possible opportunity in order to enable the most flexibility in their platform. This is commonly referred to as a late-binding workflow strategy. In the case of a printer that has built in hardware to accommodate in-device color management, a user would prefer to delay the conversion to let the printer perform all the grunt work. Disadvantages of a late-binding workflow strategy include the fact that a single incorrect application setting can corrupt one or more elements in the job and that evaluation of final output data does not occur until the last moment.

Other solutions support a single standard color space, into which all input content is converted at the first opportunity in order to maximize performance. This is commonly referred to as an early-binding workflow strategy. In the case of a standard inkjet printer, a user would prefer to have the application perform all or the majority of color management in order to minimize bandwidth use and processing time. Disadvantages of an early-binding workflow strategy include that fact that early binding means larger files that lead to slower performance, poorer quality effects, and that all color is squeezed into the output gamut and optimized for the output's total response.

SUMMARY

There is therefore a need for a color management architecture that allows for color management procedures to be implemented immediately upon entry to a platform, deferred to a destination device, or anywhere in between the two. An aspect of the described embodiments provides an architecture that allows a user to monitor, investigate, intervene, manage, and/or correct what color management is being performed, where the color management is being performed in the workflow, and by whom the color management is being performed. All input color object data is sent through a choke point for a specific operation. All pixels go through one single function, the choke point. Choke points are established for multiple types of operations, including print, display, capture, load, and save operations.

Another aspect of the described embodiments provides for a color management system that converts all color object data received through a choke point to an intermediate color space. Conversion to an intermediate color space through a single contact point allows a user to manage color object data in any desired manner. A user can mix user specific color management input from standard color spaces, ICC profiles, and non-ICC profiles. Application programs can also be used to mix color management input. Policies can be established or predefined to coordinate all color management. The policies can coordinate operation for different users, different operations, different types of devices, different devices, different manufacturers, different models, and different calibrations.

Another aspect of the described embodiments provides for dynamic color gamut mapping in hardware cards and printers. Hardware cards and printers are configured to accommodate changing color conversions initiated by a user, by an application program, or by a policy.

BRIEF DESCRIPTION OF THE DRAWINGS

The foregoing summary of the described embodiments, as well as the following detailed description of illustrative embodiments, is better understood when read in conjunction with the accompanying drawings, which are included by way of example, and not by way of limitation with regard to the claimed embodiments.

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments. It is to be understood that other embodiments may be utilized and structural and functional modifications may be made without departing from the scope of the claimed subject matter.

Figure 1:
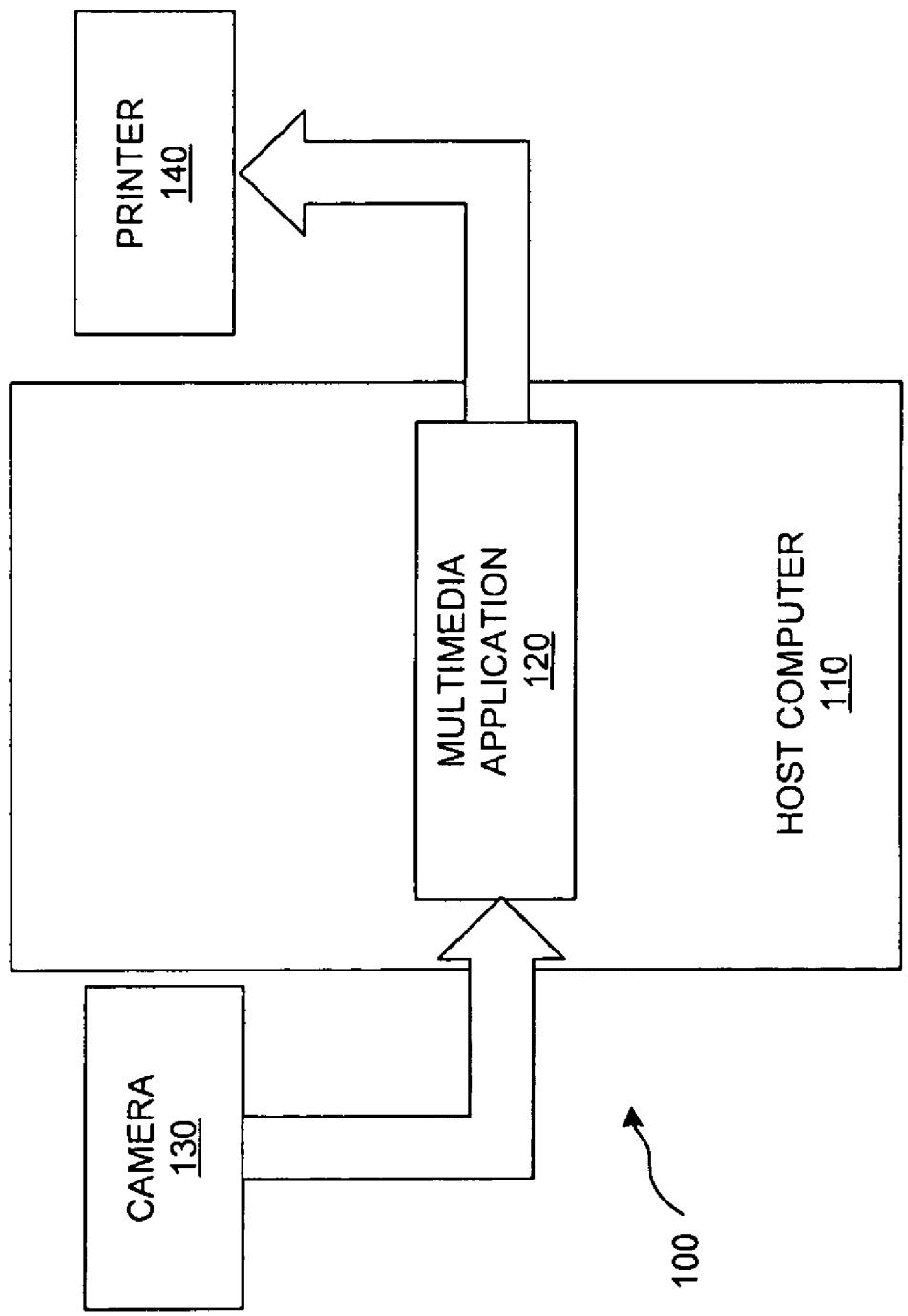
FIG. 1 is a block diagram of a color management solution including a digital camera, host computer, and printer.

FIG. 1 shows a block diagram of a color management solution 100. FIG. 1 shows a host computer 110 that includes a multimedia application 120. The host computer 110 is coupled to a digital camera 130 and printer 140. Input color object data from the digital camera 130 is processed through the multimedia application 120 and outputted to a printer 140. Under the color management solution 100, a user of the system, such as a photographer, can take a picture of an object with the digital camera 130 and print out an image of the picture on a printer 140. However, under the color management solution 100, the photographer cannot tell if either the multimedia application 120 or the printer 140 performed any color management or if both performed color management.

Figure 2:
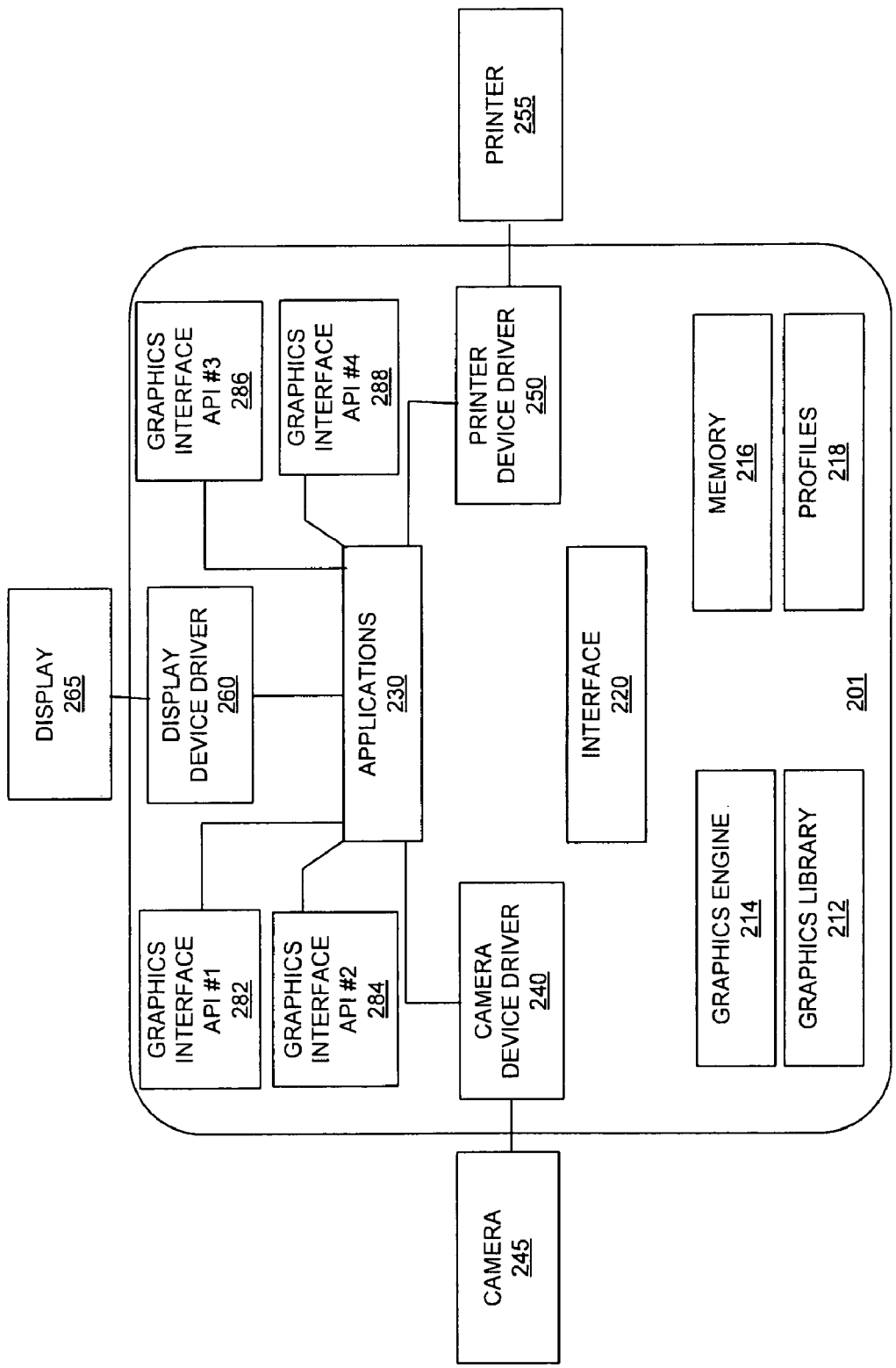
FIG. 2 is a schematic diagram of a computer graphics processing system coupled to various devices.

FIG. 2 is a schematic diagram of a computer graphics processing system 201 coupled to various devices. As shown in FIG. 2, the computer graphics processing system 201 includes a graphics engine 214 responsible for controlling and performing various computer graphics and color operations. Graphics library 212 includes numerous matrix-based and look-up table (LUT)-based data files. Graphics library 212 may be included within applications 230 or separately defined as shown in FIG. 2. Graphics library 212 may include application programming interfaces (APIs) for interacting with various components and/or vendor products. The computer graphics processing system 201 further includes a memory or storage space 216 and a profiles component 218. Profiles component 218 is essentially a LUT, with one set of entries corresponding to device control signal values and another set of entries that correspond to the actual colors that the control signals produce.

Profiles component 218 of a computer graphics processing system 201 is broken down into different classes, such as input profiles (describing scanners and digital cameras), display profiles (describing monitors and LCD displays), and output profiles (describing printers and presses). Profiles 218 generally contain information regarding three variables that describe how a device, such as printer 255, is operating. These values include the gamut of the device, the dynamic range of the device, and the tone-reproduction characteristics of the device. Other profiles 218 include information regarding instructions for handling out-of-gamut colors, more detailed tone-reproduction information, or other device specific information.

Interface 220 is a user interface that permits a user of the computer graphics processing system 201 to input color management input parameters to be performed and/or executed. Applications 230 may include APIs. Applications 230 are the platform in which various color management variables are handled. Applications 230 have settings and functions that allow a user to specify source and destination profiles and to perform conversions or, in the alternative, to defer conversion until at the destination device, e.g., printer 255. As shown, applications 230 operate with various graphics interface APIs 282, 284, 286, and 288. Graphics interface APIs 282-288 may include various multimedia APIs, product specific APIs, and/or vendor specific APIs. Applications 230 of a computer graphics processing system 201 allows any graphics interface API 282-288 to access hardware elements allowing for each to color manage images and/or objects per specific parameters for each that are not known by the other APIs. Under the computer graphics processing system 201, one graphics interface API 282 performs color management solutions completely independent of another graphics interface API 284, 286, or 288.

By way of example only, computer graphics processing system 201 includes three device drivers, a digital camera device driver 240, a printer device driver 250, and a display device driver 260. Each device driver is coupled to applications 230. Each device driver is specific to each device and allows for operation and compatibility between a device, e.g., display 265, and the computer graphics processing system 201. Coupled to each device driver is a corresponding device, digital camera 245 is coupled to digital camera device driver 240, printer 255 is coupled to printer device driver 250, and display 265 is coupled to display device driver 260.

Under the computer graphics processing system 201, any graphics interface API 282-288 can access hardware in order to perform and/or implement specific color management solutions, e.g., procedures, policies, and/or protocols. There is no coordination between the different graphics interface APIs 282-288. Therefore, a piece of data to be color managed may be color managed a multiple number of times or not at all without allowing a user to know what color management has been done, where was the color management performed, and/or who actually performed the color management.

Figure 3:
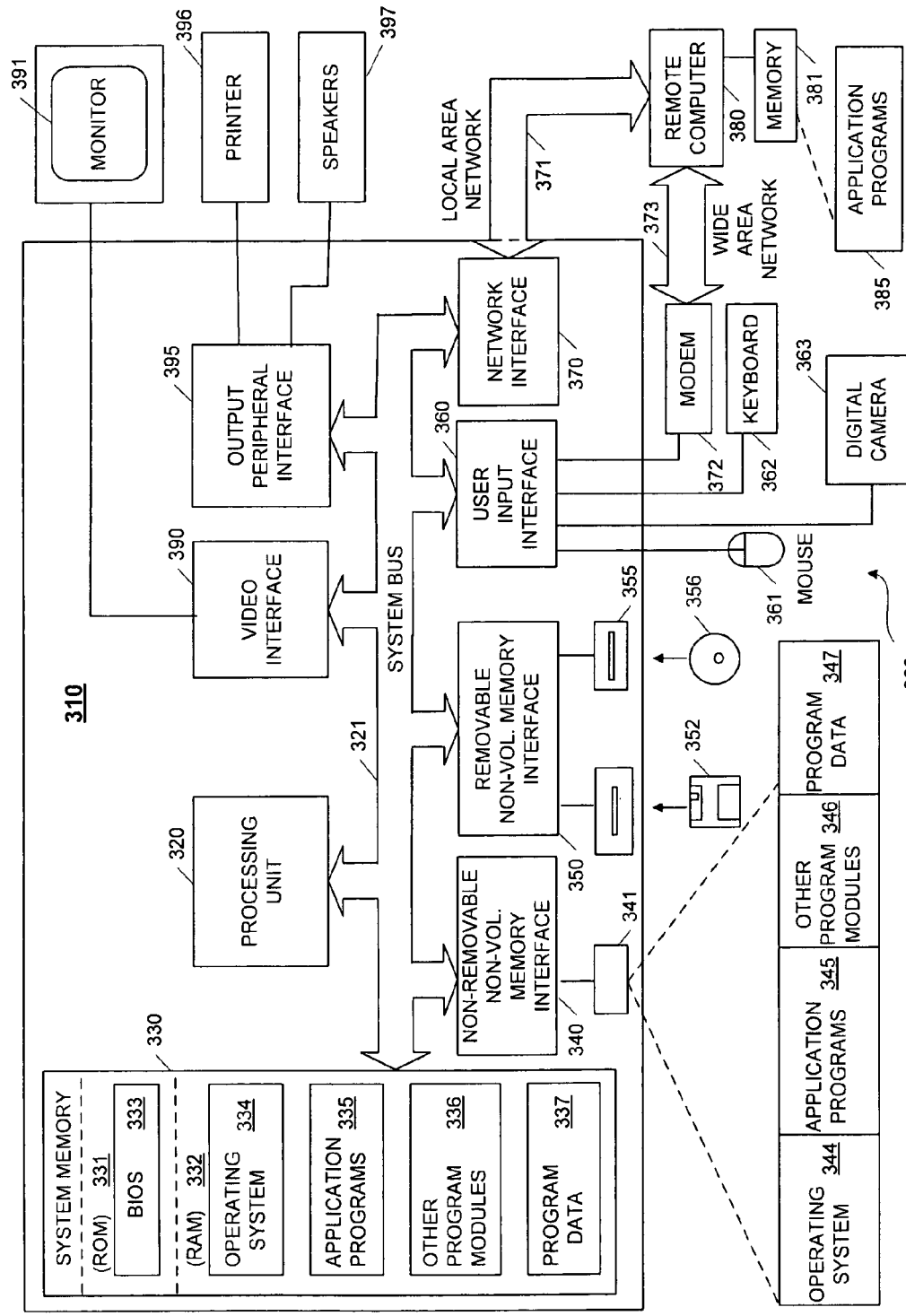
FIG. 3 illustrates a schematic diagram of a general-purpose digital computing environment in which certain aspects of the described embodiments may be implemented.

FIG. 3 illustrates an example of a suitable computing system environment 300 on which the described embodiments may be implemented. The computing system environment 300 is only one example of a suitable computing environment and is not intended to suggest any limitation as to the scope of use or functionality of the described embodiments. Neither should the computing environment 300 be interpreted as having any dependency or requirement relating to any one or combination of components illustrated in the exemplary operating environment 300.

The described embodiments are operational with numerous other general purpose or special purpose computing system environments or configurations. Examples of well known computing systems, environments, and/or configurations that may be suitable for use with the described embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The described embodiments may be described in the general context of computer-executable instructions, such as program modules, being executed by a computer. Generally, program modules include routines, programs, objects, components, data structures, etc. that perform particular tasks or implement particular abstract data types. The described embodiments may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the described embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as ROM 331 and RAM 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a digital camera 363, a keyboard 362, and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381.

It will be appreciated that the network connections shown are exemplary and other means of establishing a communications link between the computers may be used. It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 4:
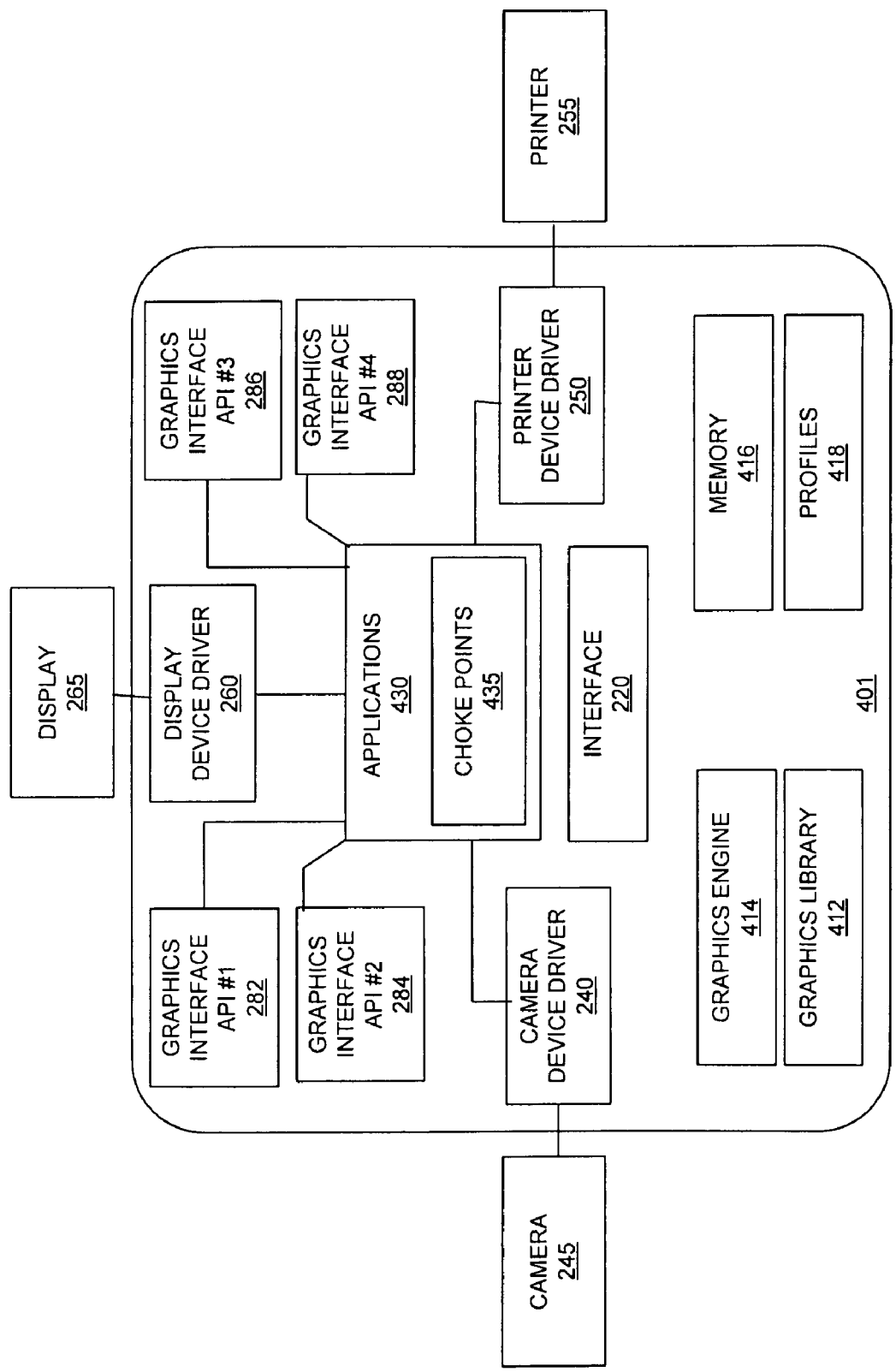
FIG. 4 illustrates a schematic diagram of an illustrative embodiment of a computer graphics processing system in accordance with at least one aspect of the described embodiments.

Referring to FIG. 4, a schematic diagram of a computer graphics processing system 401 in accordance with at least one aspect of the described embodiments is shown. Computer graphics processing system 401 is shown coupled to a digital camera 245, printer 255, and display 265 through corresponding device drivers 240, 250, and 260 respectively. Computer graphics processing system 401 is also shown to include an interface 220, allowing a user of the computer graphics processing system 401 to input color management input parameters to be performed and/or executed.

In accordance with at least one aspect of the described embodiments, computer graphics processing system 401 includes a graphics engine 414, a graphics library 412, a memory or storage space 416, a profiles component 418, and applications 430. Graphics engine 414 may be part of an operating system of the host computer. For example, the graphics engine 414 may be part of the Graphics Device Interface Plus® (GDI+) library of the Windows® XP Operating System by Microsoft® Corporation. Alternatively, the graphics engine 414 may be part of a separate computer software application, such as one of the various software products for editing and printing photographic pictures captured by digital cameras. Graphics library 412 and/or graphics engine 414 may include a converter to allow for conversion of an image/object data to an unbounded intermediate color space, such as scRGB. Defined in IEC 61966-2-2, the scRGB color space is designed to fill in the gaps between the color management provided by ICC profiles and the capabilities of sRGB. Graphics engine 414 may take a set of drawing primitives, such as vector graphics, still images, text glyphs, and video, and renders them to a software or hardware graphics surface. Graphics library 414 may include a collection of functionality that includes a graphics engine with the capability to create, manipulate, and manage graphics primitives.

Applications 430 allow for robust color management by permitting a user to monitor, inspect, interrogate, correct, modify, and/or ignore, a color management workflow. By use of choke points 435, applications 430 assure a user of what color management has been or will be preformed, when color management was or will be performed, and by whom color management has, will, or should be performed. A choke point is defined as a predefined contact point for a certain operation where all pixels of color object data are sent through one point. A system may employ a limited set of choke points instead of a single choke point such that pixels for color object data are sent through one of the set of choke points. Each pixels proceeds through one and only one choke point in the workflow, but different pixels may go through different choke points.

Under one embodiment, there are seven (7) specific operations: print operations, display operations, capture operations, load operations, save operations, copy operations, and paste operations. Each operation has an associated API that will operate to facilitate the coordination of pixels through one point of contact, the choke point. As such, color management of color object data can be coordinated for any application. For each specific operation defined, corresponding operations for legacy equipment that cannot operate with the specific APIs allow for implementation with legacy equipment. Further description of choke points is given below.

As shown, applications 430 operate with various graphics interface APIs 282, 284, 286, and 288. As will be described more fully below, each graphics interface API 282-288 operates through a choke point 435. Because of these choke points 435, a user can determine whether to assign particular policies for color management by graphical application, by user, by device, and/or by operation. A policy looks for the implicit profile associated with or the explicitly embedded profile within the imported color object data and compares the profile (or lack of profile) with the current working space to make color management decisions. Further, a user can monitor color management to determine when and where changes occur and/or whether to implement additional color management in a workflow at a specific time, not just at a destination device, e.g., late-binding, or once upon entry to a platform, e.g., early-binding.

Figure 5:
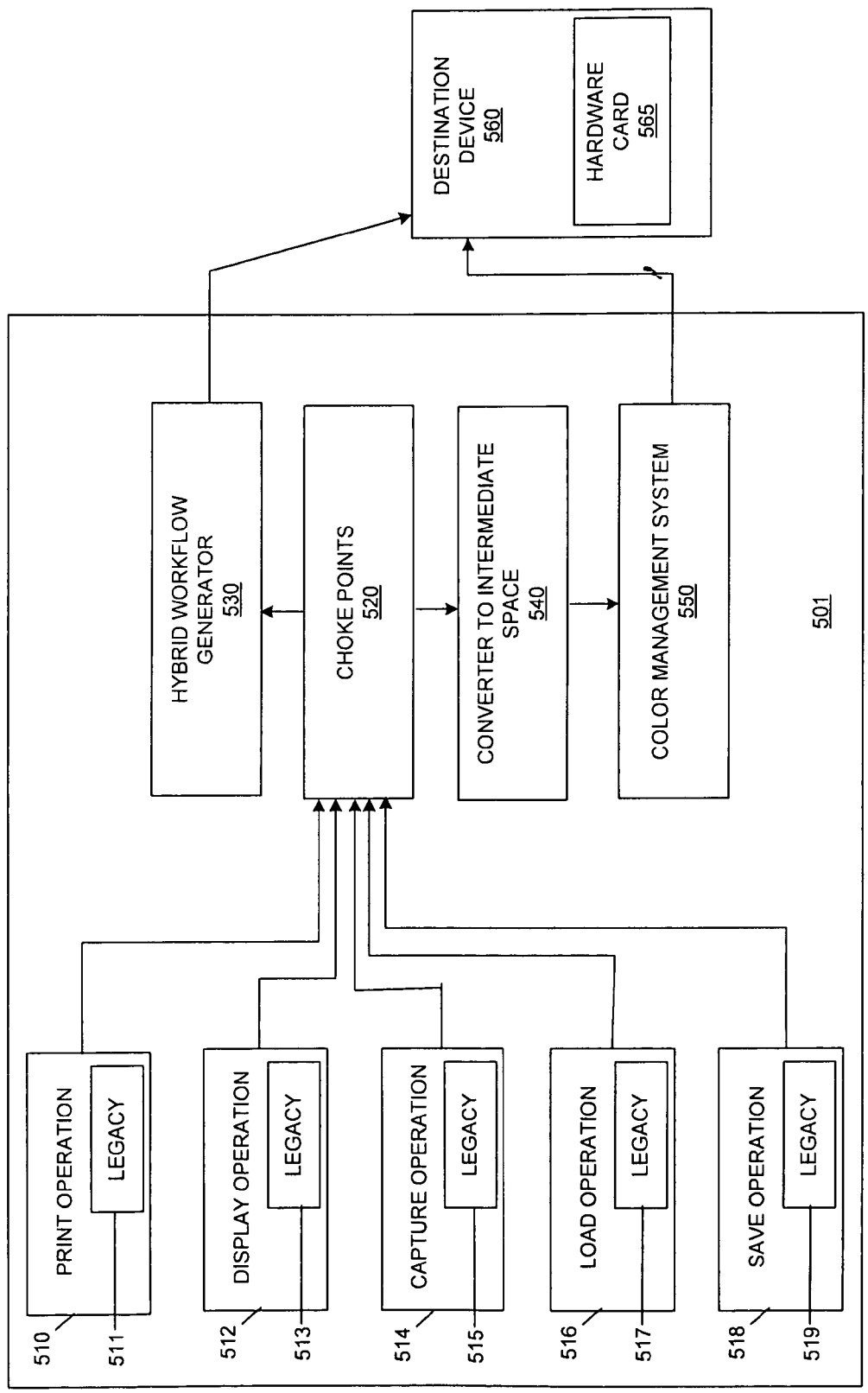
FIG. 5 is a block diagram of an illustrative embodiment of a color management architecture in accordance with at least one aspect of the described embodiments.

Referring now to FIG. 5, a block diagram of an illustrative embodiment of a color management architecture is shown in accordance with at least one aspect of the described embodiments. The color management architecture illustrated in FIG. 5 includes a computer graphics processing system 501. Computer graphics processing system 501 includes choke points 520, a hybrid workflow generator 530, a converter 540, and a color management system 550. For the example shown in FIG. 5, a destination device 560, such as a printer, is coupled to the computer graphics processing system 501.

Each operation 510-519 has a specific API associated with it that will operate to facilitate the coordination of pixels through one point of contact, the choke point. As such, color management of color object data can be coordinated for any application. For each specific operation defined, corresponding operations 511, 513, 515, 517, and 519 for legacy equipment that cannot directly operate with the specific APIs allow for implementation with legacy equipment. Legacy equipment have a small set of potential options. The APIs described above can be used to facilitate the coordinate of the pixels in such a manner to be optimally color managed for the legacy device according to the UT policy chosen by the user. Specifically, print operation 510 and legacy print operation 511 relate to actions taken to print color object data. Display operation 512 and legacy display operation 514 relate to actions taken to display color object data. Capture operation 514 and legacy capture operation 515 relate to actions taken to capture, e.g., by a digital camera, color object data. Load operation 516 and legacy load operation 517 relate to actions taken to load, e.g., from a storage space, color object data. Save operation 518 and legacy save operation 519 relate to actions taken to save, e.g., to a storage device, color object data.

Operations 510-519 are coupled through respective choke points 520. An API is initiated for the respective operation to interface with the computer graphics processing system 501. Upon entry at choke points 520, the computer graphics processing system 501 can determine whether to defer conversion of the color object data to the destination device 560 or perform the conversion at the application end, e.g., within the computer graphics processing system 501. Should the computer graphics processing system 501 determine that conversion is deferred, hybrid workflow generator 530 generates a hybrid workflow in order to defer color conversion until rendering time at the destination device 560. Alternatively, should the computer graphics processing system 501 determine to perform the conversion at the application end, converter 540 converts the color object data to an intermediate color space, such as scRGB. Performance of the conversion process is optimized because the conversion is happening at specification time and not rendering time.

After color object data is converted to an intermediate color space, such as an unbounded intermediate color space, color management system 550 can mix management input from standard color spaces, ICC profiles, and non-ICC profiles into the intermediate color space. The color management system 550 can operate in response to user specific inputs, application programming, and/or policies that have been previously established. User specific inputs include initiating a specific addition, augmentation, correction, modification, etc. to the captured image data and/or merely monitor or inspect the color management actions that have previously been or will further be performed. An application program may be a specific color management operation that a user has established for a program, such as Photoshop®, from Adobe Systems Inc. of San Jose, Calif., and/or a default color management solution for a particular application.

A policy system allows a user to define and coordinate color management across multiple devices, operations, and users. Policies may be based upon a particular user currently utilizing the computer graphics processing system 501, a particular operation performed, such as a capture operation or legacy print operation, a particular type of device, such as a digital camera or a scanner, a particular device of a particular vendor, a particular model of the device, and even a particular calibration setting on the model. Color management system 550 includes the ability to implement color management based upon some other criterion and/or a default criterion.

Color management system 550, operating upon an intermediate color space through a choke point, allows the user to determine what color management has already taken place, if any, on color object data. Further, color management system 550 allows a user to monitor where the converted color object data is going and the color management solutions that are to be implemented by the destination device 560. Through the computer graphics processing system 501, a user can investigate, manage, monitor, intervene, correct, or otherwise manipulate or control color object data anywhere within the processing process. The ability to monitor, manage, investigate, intervene, correct, or otherwise manipulate or control color object data anywhere within the processing process may be done through the user interface policy.

Destination device 560 includes a hardware card 565. Hardware card 565, whether included in a printer or some other destination device 560, provides for dynamic color gamut mapping. Hardware card 565 is configured to accommodate changing color conversions initiated by a user, by an application program, or by a policy. Hardware card 565 is configured to operate with the intermediate color space and color management system 550 within the computer graphics processing system 501. Alternatively, hardware card 565 may be embedded into a display itself as opposed to a graphics card in a computer.

Figure 6:
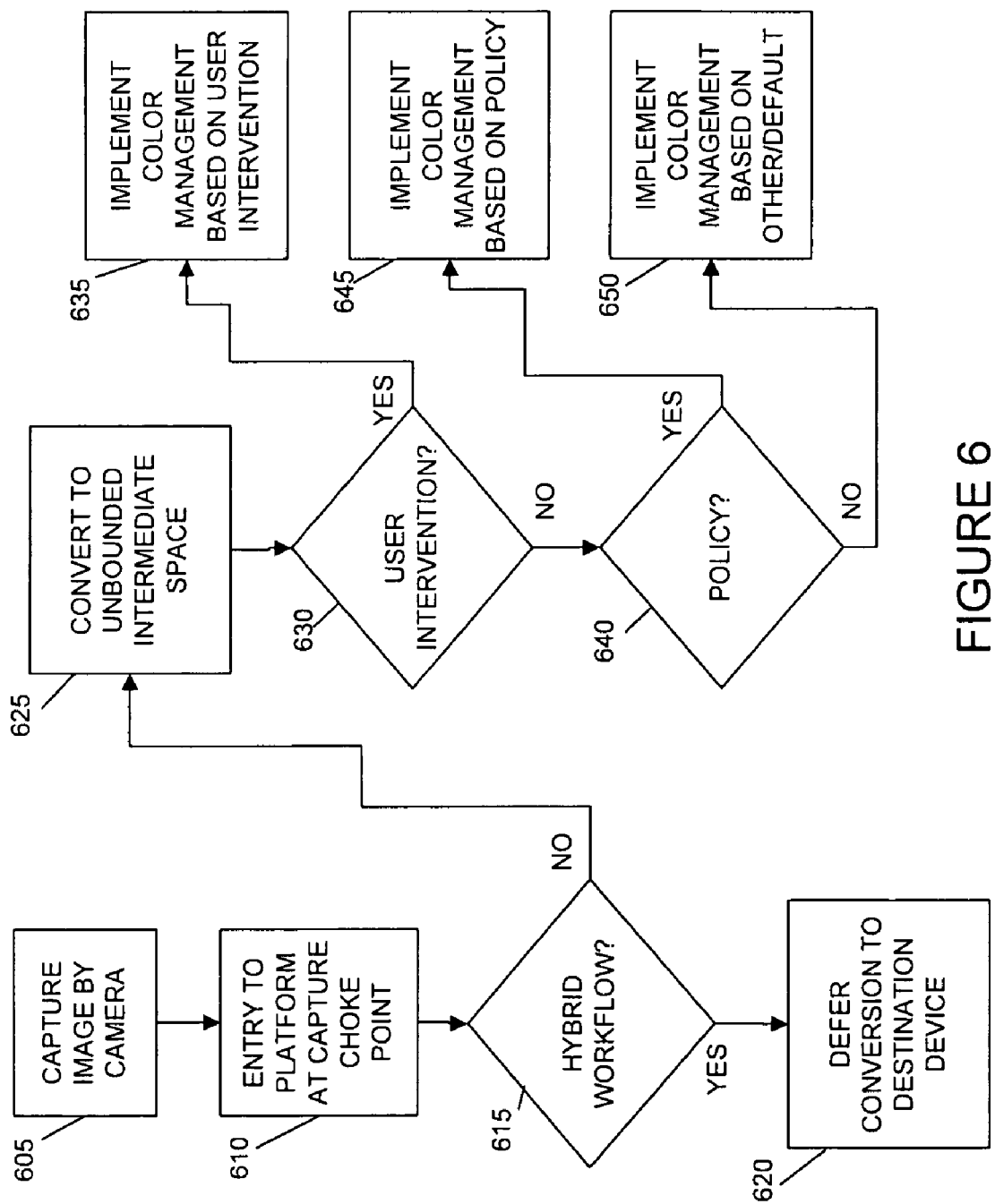
FIG. 6 is a flow chart of an illustrative method for performing a capture operation for maintaining accurate color management in accordance with at least one aspect of the described embodiments.

FIG. 6 shows a flowchart illustrating the steps to perform a capture operation for maintaining accurate color management according to an exemplary implementation of the described embodiments, which can operate in conjunction with the computer graphics processing system 401 described in FIG. 4. At step 605, an image is captured by a digital camera and stored in some internal memory. At step 610, the image data enters an application platform at a capture choke point. All pixels of the image data must pass through the choke point, thereby allowing for enhanced color management. At step 615, a determination is made as to whether an optional hybrid workflow should be created to defer color conversion until rendering time. Such an optional step 620 allows a user to delays the performance intensive color conversion from source to destination device until a later time.

If no hybrid workflow is to be created, at step 625, color conversion takes place to an unbounded intermediate color space, such as scRGB. At step 630, a determination is made as to whether any type of user intervention has been initiated. Should the user decide to implement color management, at step 635 the user, through interface 220, may color manage the converted image data in any of a number of manners, including initiating a specific addition, augmentation, correction, modification, etc. to the captured image data and/or merely monitor or inspect the color management actions that have previously been or will further be performed.

At step 640, a determination is made as to whether an application program or policy is in effect for the captured image data. If an application program or policy is in effect, at step 645, color management is implemented based upon the application program or policy. As described above, policies may be based upon a particular user, a particular operation performed, a particular type of device, such as a camera or a scanner, a particular device of a particular vendor, a particular model of the device, and even a particular calibration setting on the model. If an application program or policy is not in effect, at step 650, color management is implemented based upon some other criterion and/or a default criterion.

It should be understood by those skilled in the art that multiple types of color management may be implemented in accordance with the described embodiments. Color management based upon user intervention may be preceded by, accompanied by, or followed by color management based on policies that have been established. Further, color management may include no performance at all. In addition, it should be understood by those skilled in the art that the exemplary illustration as shown and described in FIG. 6 may be adapted for other operations, such as display, print, load, and save.

While illustrative systems and methods as described herein embodying various aspects of the described embodiments are shown, it will be understood by those skilled in the art, that the claimed subject matter is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the claimed subject matter. The description is thus to be regarded as illustrative instead of restrictive on the described embodiments.

We claim:

1. A software architecture embodied on one or more computer-readable storage media, the architecture for processing a color object in a workflow, the software architecture comprising:
   at least one component configured to receive a color object through an operation choke point, wherein the color object is obtained from a device and the operation choke point is independent of a device driver coupled to the device; and
   at least one application program interface configured to access the component.

2. The software architecture of claim 1, wherein the operation choke point is configured to operate with legacy equipment.

3. The software architecture of claim 1, wherein the at least one application program interface is further configured to one or both of:
   determine where to convert the color object in the workflow; or
   direct an operation of the operation choke point.

4. The software architecture of claim 1, wherein the at least one application program interface is configured to access the at least one component responsive to a request.

5. The software architecture of claim 4, wherein the request is associated with monitoring the workflow.

6. The software architecture of claim 4, wherein the request is associated with intervening in the workflow.

7. A method comprising:
   receiving, with a color processing component, a color object through an operation choke point, wherein the color object is obtained from a device and the operation choke point is independent of a device driver coupled to the device; and
   accessing the color processing component utilizing one or more application program interfaces.

8. The method of claim 7, wherein the operation choke point operates with legacy equipment.

9. The method of claim 7, further comprising one or both of:
   determining where to convert the color object in a color management workflow; or
   directing an operation of the operation choke point.

10. The method of claim 9, wherein determining and directing are performed at least in part utilizing one or more of the application program interfaces.

11. The method of claim 7, wherein accessing is performed responsive to a request.

12. The method of claim 11, wherein the request is associated with one or both of:
   monitoring a color management workflow associated with the color object; or
   intervening in a color management workflow associated with the color object.

13. One or more computer-readable storage media embodying computer-readable instructions which, when executed, implement a method comprising:
   receiving, with a color processing component, a color object through an operation choke point, wherein the color object is obtained from a device and the operation choke point is independent of a device driver coupled to the device; and
   accessing the color processing component utilizing one or more application program interfaces.

14. The one or more computer-readable storage media of claim 13, wherein the operation choke point operates with legacy equipment.

15. The one or more computer-readable storage media of claim 13, further comprising one or both of:
   determining where to convert the color object in a color management workflow; or
   directing the operation of the operation choke point.

16. The one or more computer-readable storage media of claim 15, wherein determining and directing are performed at least in part utilizing one or more of the application program interfaces.

17. The one or more computer-readable storage media of claim 13, wherein accessing is performed responsive to a request.

18. The one or more computer-readable storage media of claim 17, wherein the request is associated with one or both of:
   monitoring a color management workflow associated with the color object; or
   intervening in a color management workflow associated with the color object.

* * * * *